(12) United States Patent
Vaughn

(10) Patent No.: US 6,205,910 B1
(45) Date of Patent: Mar. 27, 2001

(54) TOASTER ASSEMBLY AND METHOD FOR TOASTING BREAD PRODUCTS

(75) Inventor: Thomas Daro Vaughn, Ballwin, MO (US)

(73) Assignee: Star Manufacturing International Inc., St. Louis, MO (US)

(*) Notice: Subject to any disclaimer, the term of this patent is extended or adjusted under 35 U.S.C. 154(b) by 0 days.

(21) Appl. No.: 09/549,774

(22) Filed: Apr. 14, 2000

Related U.S. Application Data

(60) Provisional application No. 60/129,556, filed on Apr. 16, 1999.

(51) Int. Cl.$^7$ .................................................. A47J 37/08
(52) U.S. Cl. ...................... 99/326; 99/329 P; 99/329 RT; 99/331; 99/385; 99/389; 99/391; 219/521
(58) Field of Search ............................. 99/326–333, 339, 99/340, 385–393, 400, 401, 444–450, 482, 483; 219/521, 492, 494, 497

(56) References Cited

U.S. PATENT DOCUMENTS

| | | | |
|---|---|---|---|
| 2,503,960 | * 4/1950 | McCullough | 99/327 |
| 2,673,516 | * 3/1954 | Reichold | 99/327 |
| 2,878,748 | * 3/1959 | Stanek | 99/329 P |
| 3,869,970 | * 3/1975 | Eagle | 99/329 RT |
| 3,956,978 | * 5/1976 | Borley | 219/502 |
| 4,154,151 | * 5/1979 | Mochizuki | 99/329 R |
| 4,188,865 | * 2/1980 | Bjarsch | 99/327 |
| 4,510,376 | * 4/1985 | Schneider | 219/492 |
| 4,755,656 | * 7/1988 | Charlesworth et al. | 219/492 X |
| 4,878,423 | * 11/1989 | Bikert et al. | 99/391 |
| 5,072,662 | * 12/1991 | Yip | 99/327 |
| 5,095,814 | * 3/1992 | Ott et al. | 99/391 |
| 5,598,765 | * 2/1997 | Yip | 99/391 X |

OTHER PUBLICATIONS

"Replacement Parts Price List for Models: BTM 4–L and BTM 4–H", published Jan. 3, 1994, by the Toastwell Company.

"Replacement Parts Price List for Models BTM 4–L & BTM 4–H", published by Star Manufacturing International Inc., Jun. 19, 1997.

(List continued on next page.)

Primary Examiner—Timothy F. Simone
(74) Attorney, Agent, or Firm—Polster, Lieder, Woodruff & Lucchesi, L.C.

(57) ABSTRACT

A toaster/heater assembly for toasting and heating food products has a housing containing a frame, and a heating chamber having a toaster/heater ensemble which heats two compartments of the chamber. The ensemble has a middle unit and two side units, each of which are divided into two insulating boards having side edges with nibs separated by notches. A pair of lower terminals are spaced from each other and connected to ends of a heating element. For the side units, the heating element winds from a terminal around the nibs and notches of one board section to then cross to the other board section to likewise wind, so that almost all of the strands of the element face a heating compartment. The middle unit heating element winds through the notches and nibs and crosses to the other board section and likewise winds about it so that heat radiates from both of its sides to two different compartments. The boards have food guides, such as rods, extending from mounts about the top and bottom of the boards to space the food products from the heating elements. Lugs extend from the bottom mounts to fit in corresponding frame openings. Lugs extend from the sides of the mount plate into corresponding frame fittings. The units can be handled by grasping the food guides. The frame has an activating switch aligned with part of a carriage for the units to be activated by the carriage part upon descending.

31 Claims, 8 Drawing Sheets

OTHER PUBLICATIONS

"Owners Operating & Installation Manual", published Mar. 1993, by Toastmaster Division of Middl eby Corp.

"ET Series Toasters", published by Hobart, May, 1989.

"How To Get The Most For Your Bread", published by Wells Manufacturing Co., at least by 1997.

"Toastwell BTM Toaster," published Apr. 2, 1997 by Star Manufacturing International Inc., showing parts list.

Group of eight photographs of a Wells unit, such as referred to in item 5 above, marked as a group as Exhibit 1, Undated.

A group of three photographs of a Toastmaster unit such as referred to in item 2 above, and marked as Exhibit 2, with each photograph designated A, B and C, Undated.

A group of photographs marked as Exhibit 3, showing a heater unit of the prior art such as disclosed as element MT 21 in the drawing and parts list of items 1 and 2 above, and sold by the Toastwell Company at least as of Jan., 1994.

* cited by examiner

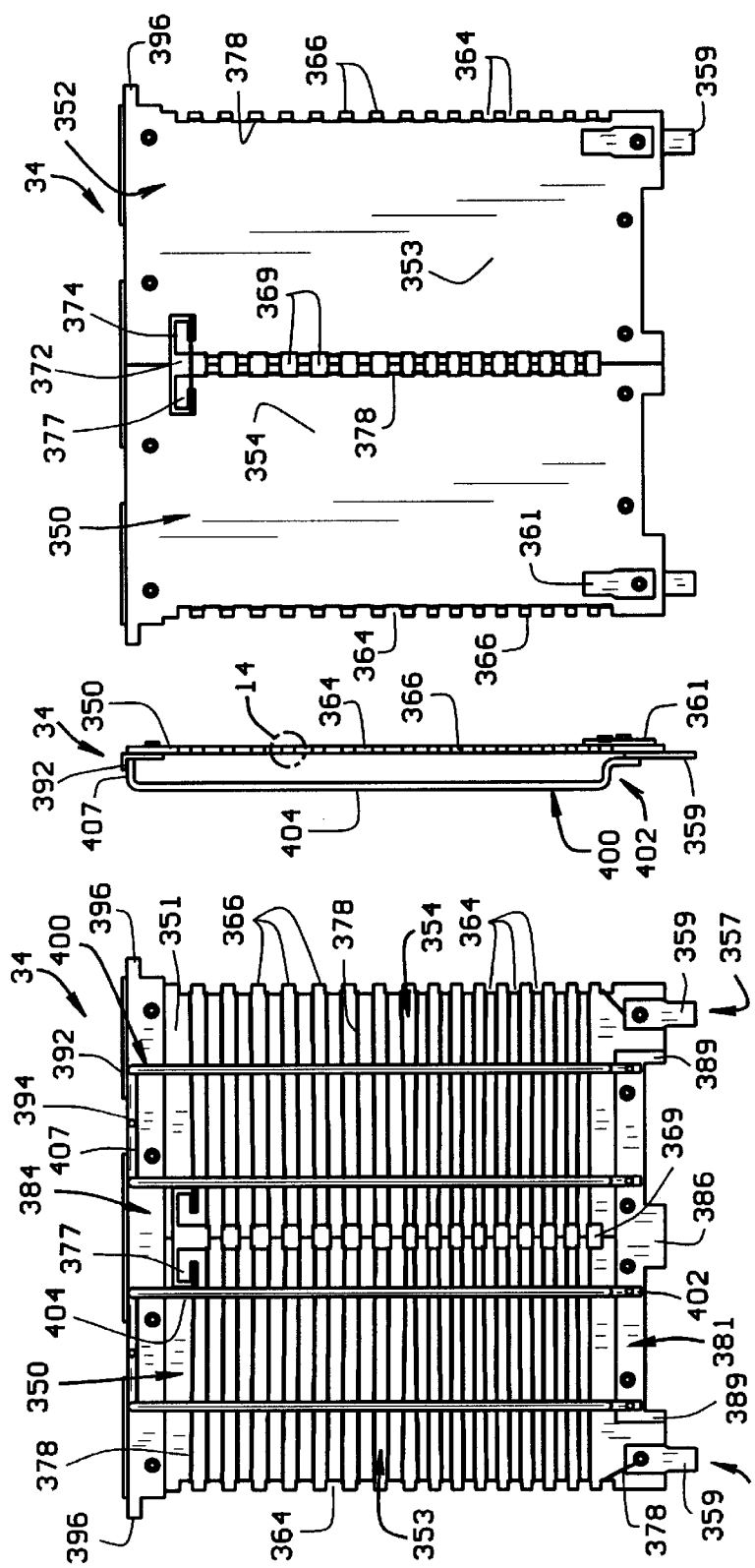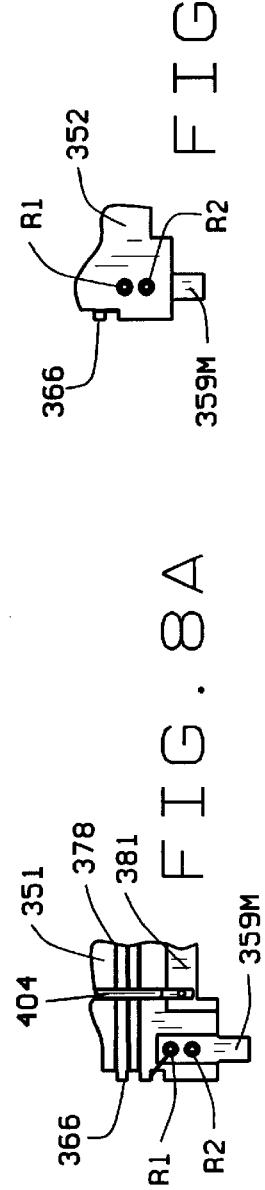
FIG. 10
FIG. 10A
FIG. 9
FIG. 8
FIG. 8A

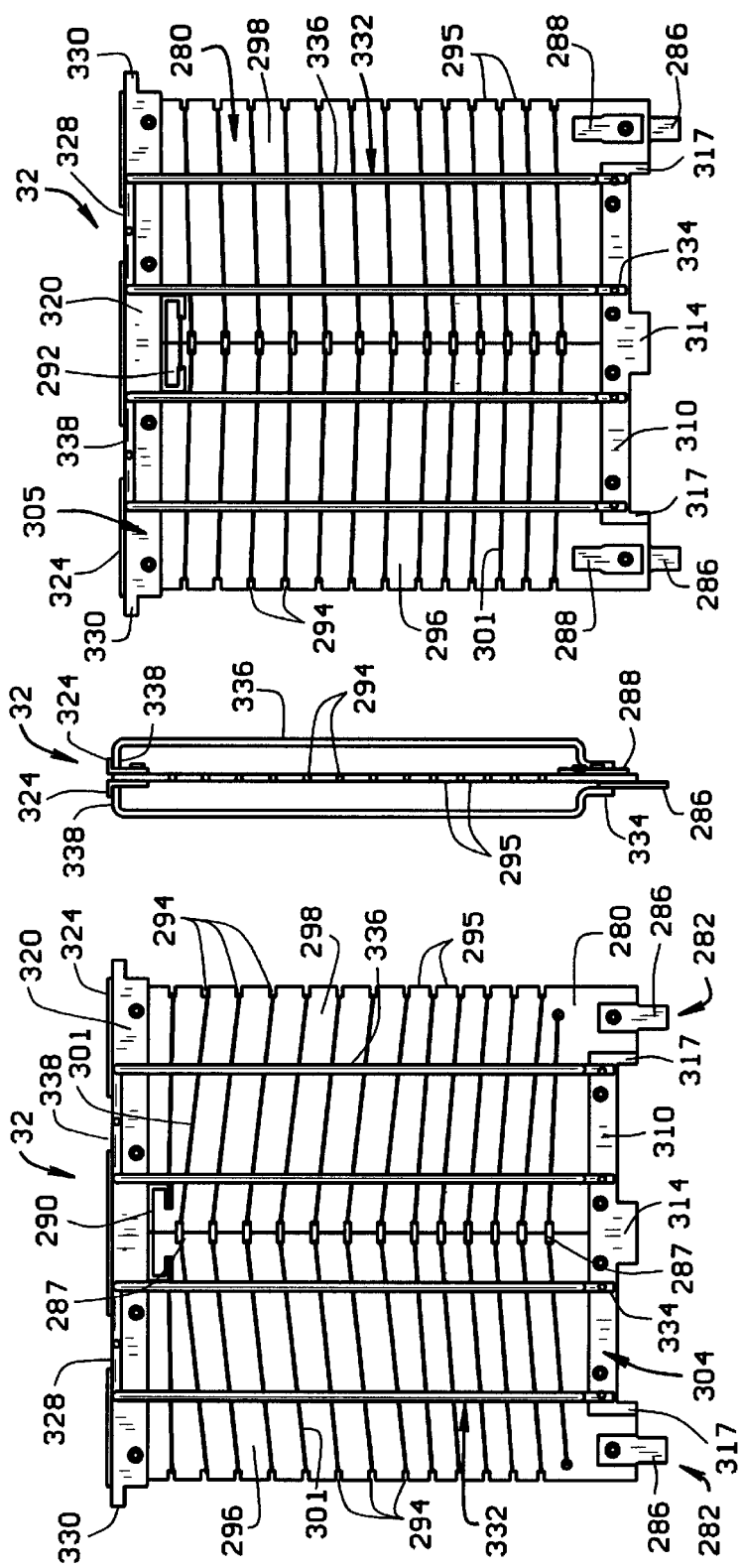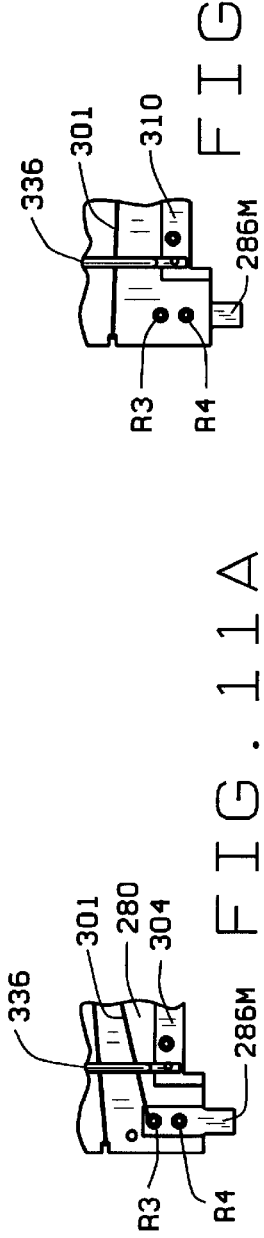
FIG. 11    FIG. 12    FIG. 13
FIG. 11A    FIG. 13A

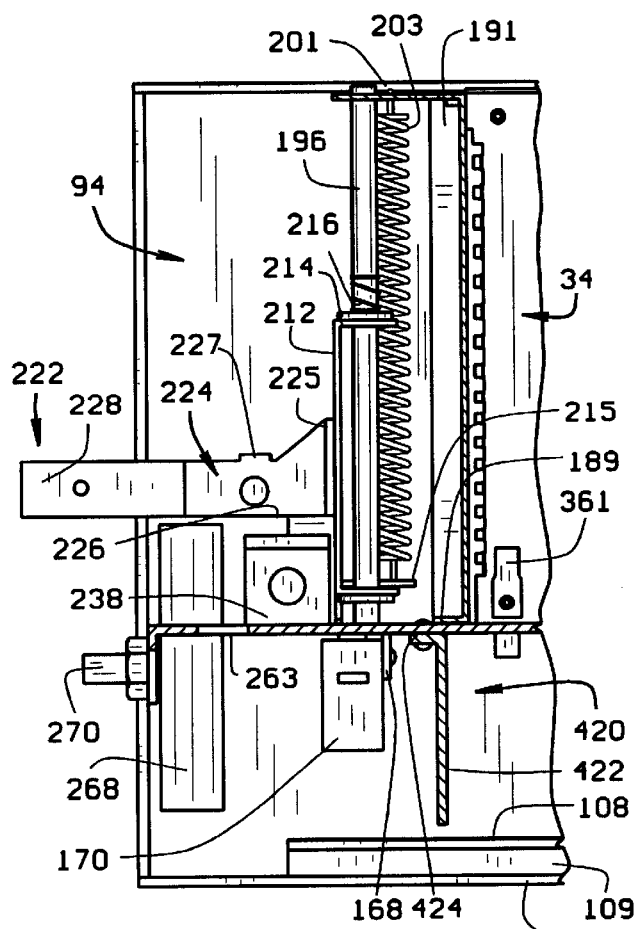
FIG. 15
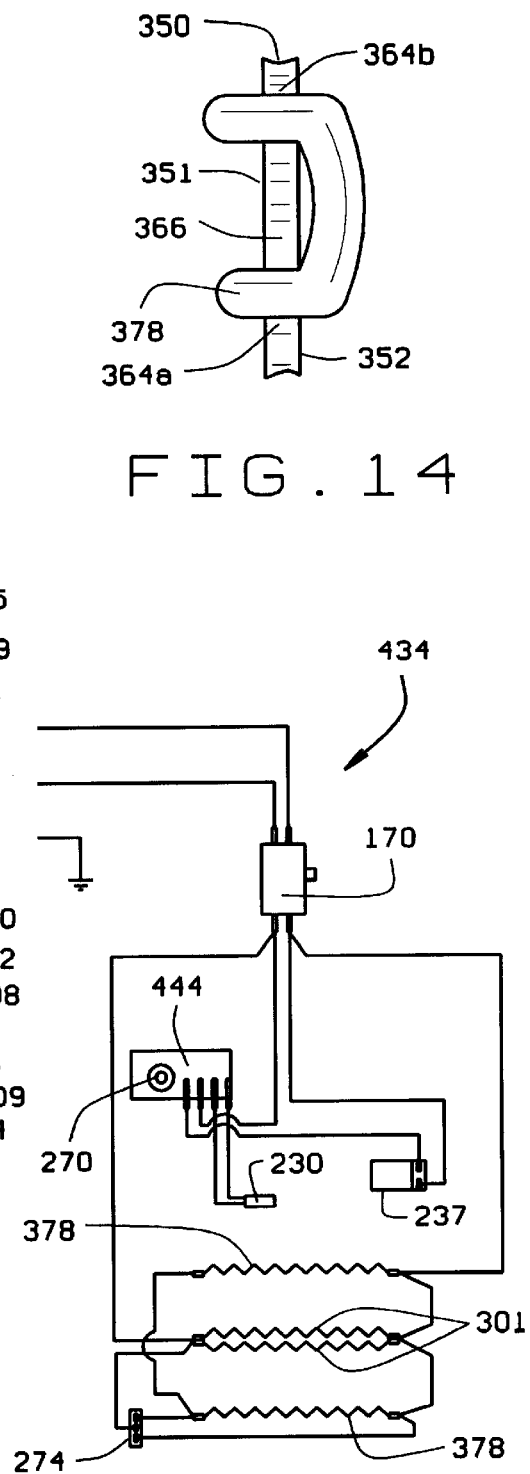
FIG. 14
FIG. 16

TOASTER ASSEMBLY AND METHOD FOR TOASTING BREAD PRODUCTS

CROSS-REFERENCE TO RELATED APPLICATIONS

This application is the utility application of U.S. provisional application No. 60/129,556 filed Apr. 16, 1999.

STATEMENT REGARDING FEDERALLY SPONSORED RESEARCH OR DEVELOPMENT

Not Applicable.

BACKGROUND AND FIELD OF THE INVENTION

The present invention relates to toasters for toasting and heating food products such as bread, bagels, and other food items such as waffles or poptarts, and especially to such toasters used for commercial purposes. Such toasters have had electrically heated elements within the toaster that radiate heat toward food products placed near the element. In a commercial setting such toasters are submitted to repetitive use and the durability and life of the product is important. Additionally, in commercial establishments, toasters are placed on work counters or tables and thus take up space. The space on such counters, tables and the like, can be used for a variety of purposes such as placing food or trays thereon. The toasters may be placed adjacent or near a wall or other piece of equipment, and heat from the toaster can radiate outwardly to heat such nearby objects or things.

In the prior art, toasters have used a toaster/heater unit that has been mounted within a frame of a toaster housing. Such units have comprised a sheet of insulating materials such as mica or thicker ceramic fiber. The sheet has had a rectangular shape wherein the thickness is much smaller than the width and height. The sheet has been divided into two separate sections. Holes have been formed in the center of the two divided sections. The edges of the board have a plurality of notches interspaced by a plurality of projecting nibs. The holes in the center of the two board sections are formed by a plurality of notches and projecting nibs extending along the inside edges of the two board sections. An electrical heating element has been wrapped around the prior art board sections to pass through notches in the edges of the board, to wrap through the center holes to thus wrap around both sides of the board sections. The wrapping of the band has extended first around both sides of a board section. After wrapping around one board section, the band extends to the outer edge of the other board section. The band then wraps around the length of the other board section from one side to the other side. The ends of the heating element have been connected to electrical terminals. With such wrapping of the heating element about the board, there is about as much of the heating element windings on one side of the board as on the opposite side of the board. The windings are closer together at the bottom of the board than at the top, with the space between strands incrementally increasing from bottom to top. Such prior art units have been mounted with a frame inside the housing so that a piece of bread, bagel or other food item is placed between the sides of two such toaster/heater units. The heat radiating from the two boards radiates toward each side of the food item, for example, bread, to toast or heat the bread. However, in such prior art units a large amount of heat is also radiated from the side of the boards of the heater/toaster units that face away from the food item. Such radiated heat does not act to heat or toast the food item but simply heats the unit unnecessarily. With such prior art unit, to toast or heat multiple food items simultaneously, the heating/toaster units are arranged in pairs. For example, with four pairs of boards, each pair of boards are spaced from each other so that a toaster/heating compartment is formed therebetween. Typically the compartments were aligned so that one of the heater/toaster boards was towards the side of the housing of the toaster on opposite sides of the unit. Space is provided between the toaster/heater units within the housing to more greatly separate them from each other to reduce the impact of the heat radiating to adjacent units. Such prior art units thus contain a lot of dead and ineffectively used space between the compartments. Such prior art units generate unnecessary heat within the unit and also cause the units to be large because of the space provided to separate the sides of the boards that radiate away from the toaster/heating compartments.

In the prior art, the boards of such toaster/heater units have had terminals connected to the ends of the heating element. The terminals have comprised metal plates mounted on opposite sides of the boards to face one another in close proximity. The portions of the terminals that projected from the board are separated by a piece of insulating material such as mica. However, with such an arrangement, a crack or abnormality in the material separating the terminals could cause a short circuit between the terminals and thus improper performance of the heating element. Further the terminals and the wiring to them are toward the top of the board and hence receive heat flowing by convection from therebelow toward the top of the board.

Also in the prior art the heating element boards are mounted within the surrounding structure that served as bread or food guides, to prevent the food product from getting too close to the heating element. However the heating element board was capable of movement relative to such surrounding structure so that there was not a fixed distance between the heating element board and the surrounding food guide structure. Such lack of uniformity creates unpredictability in the degree of heating or toasting of the food.

Additionally, in the prior art there has been employed carriage assemblies with food supports upon which the food can be placed to be lowered and raised into and out of the toaster/heater compartments. Such carriages have used a pin to engage the surface of a pivoting lock member to push it to the side as the carriage descends until the pin moves into the slot beneath the locking member. The locking member pivots by spring action to overlie the carriage pin.

Such prior art carriage member has interacted with a switch to control the toasting/heating of the food product. The activating switch in the prior art has a button or the like which is moveable to set the switch in an on or an off position. The carriage has descended so that an extension from it strikes the button at an angle, causing less than desirable function and also wear and tear on the switch button or the like.

BRIEF SUMMARY OF THE INVENTION

The present invention improves over the prior art and provides a number of advantages for toasting and heating food for use in the conditions of a commercial operation.

The toaster/heater assembly of the invention provides a toaster/heater unit which can be mounted with a housing frame. The toaster/heater unit has a board of insulating material with a heating clement mounted with it. The toaster/heater unit has a food guide mounted in association with the element board which projects outwardly from the heating element and from the board. Preferably the food guide extends from the top to the bottom of the board. The guide can comprise a rod that projects outwardly from the side of the board near the top and the bottom of the board so that it is spaced from the heating element to thus provide a barrier between the heating element and the food to be toasted/heated. The guide can be shaped to have a bite section so that the bite section can be mounted to one position, such as at the top of the board, and the ends of the rods that extended from the bite can be mounted at another end, such as at the lower end of the board.

The toaster/heater units can have support plates for the food guide. The food guide can be secured to the plates so that the food guide and toaster/heater unit are unitary structure. The supports can be positioned near the top and the bottom of the clement board. In the case of the heating element board wherein the heating element is wound to be substantially on one side of the board, the food guides and mount plates are preferably only on the side of the board along which the heating element substantially extends. In the case of a heating element board with a winding extending about equally on both sides of the board, the upper and lower plates can be mounted opposite one another.

The lower plate can have a depending lug and depending legs spaced therefrom, which all fit in conforming openings in the deck of a support platform to provide stability and to hold the board and guide in a fixed position relative to the frame. The upper support plate preferably has engagement lugs extending outwardly therefrom that fit within openings in the frame walls to also provide stability and fixed positioning relative to the frame. The lugs can be bent after they extend through the frame openings. The upper plate can be angle-shaped for ease of gripping and strength. The top flange of the angle can have recesses above the connection point of the bread guides to facilitate making the connections.

The heating element board has a pair of terminals connected to the ends of the heating element. The terminals can project through openings in the platform deck to be connected to electrical wiring below. The terminal plates can be each secured at two points relative to the element board so as to prevent pivoting and provide a secure connection. The heating element can extend to connection with the terminals, and preferably connects at the upper connecting point of the terminals with the board. The terminals are laterally spaced from one another so that the insulating board materials separates them to prevent electrical short circuiting between the terminals.

The combined board with heating band and bread guides provide an integral unit that can be easily handled. The units can be easily installed with the housing frame and mounted securely so as not to wobble relative to the frame. The units can also be easily removed from the frame for servicing. Because the food guides are integral with the heating element board, the position between the guides and the board is fixed and invariable. The heating elements expand when heated, and the distance between the heated strands and the guides is also uniform. This construction provides uniformity in the distance between the food products placed in the heating compartments and the adjacent boards and heating elements that radiate heat toward the food product. The positioning of the terminals at the bottom of the board allows the convection heat generated by the heating elements to flow upwardly away from the terminals and wiring to avoid overheating them, rather than toward the terminals and wiring as in the prior art.

The interconnection between the food guides and the boards provides rigidity to the unit so that it is not easily cracked, broken or bent. The food guides provide a frame structure that increases the section modulus of the unit to better resist distorting forces. The food guides which project away from the element board, as well as the support plates, provide good gripping points for a hand to grasp a unit and install it or to remove it for servicing.

The invention further provides for winding of the heating element so that almost all of the strands of the element extend along the surface of one side of the board, with little of the heating element extending on the other side of the board. The board has edges with a plurality of notches, with nibs formed between the notches. The board has a series of openings located between the edges. These openings are preferably generally centrally located. The board can be divided in to two sections. Notches and nibs on the inside edges of the two board sections can form the opening between the edges. The heating element extends along the surface of the first side of the board to pass through a notch in an outer board edge, and then it is wrapped around the adjacent nib to pass along the surface of the second side of the board. Thence it extends through an adjacent notch along the surface of the first side of the board. This pattern can be used on both sides of the board. When the element reaches the top of the first board section it extends to the top of the other outer board edge and winds downwardly With this pattern almost the entire element lies on one side of the board and little of the element is on the opposite side of the board. The windings are closer to each other toward the bottom of the board, and incrementally the space between them increases going from the bottom to the top of the board sections to thus take advantage of the heat that rises upwardly from the lower windings.

The toaster/heating units can be arranged in an ensemble. The ensemble comprises a middle toaster/heater unit, which has the heating element extending about it approximately equally on both sides of its mounting board. The ensemble further comprises two side units each of which has the heating element extending almost completely along the surface of one side of the board. The ensemble is arranged so that the two side units have their sides with the heating element largely thereon, facing the two sides of the middle unit. Two toaster/heating compartments are thereby formed, one compartment being between one of the side units and the middle unit, and the other compartment being between the other side unit and the middle unit.

The toaster/heater unit can have multiple ensembles within the housing. The ensembles can be arranged so that one of the side units for one of the ensembles has its minimal radiating side facing towards a housing wall, while the other side unit has its minimal radiating side facing the minimal radiating side of another side unit. With such an ensemble configuration, unnecessary heat dissipation within the unit is minimized. Rather than having, for example, eight toaster/heater units to toast or heat four food items as in the prior art, only six of the units of the invention are needed for the same number of food items. The use of the ensembles provides for a more compact unit. Because of the control of heat dissipation, less electrical power is needed to heat or toast a food product. The more compact nature of the unit allows it to take up less counter space or table space in a commercial operation. The control of heat dissipation further prevents problems with adjacent objects such as walls, or other equipment, from becoming overheating, burned, or otherwise damaged.

The method of mounting the toaster/heater units with a frame allows for easy installation and serviceability. The units can be easily gripped and installed to the frame. An individual unit in need or repair can be easily removed and a substitute unit easily installed in its place.

The invention further provides for a carriage for a food support assembly. The carriage has structure that moves vertically relative to the frame. The carriage structure has a bottom switch-engaging member with a substantially flat surface that moves vertically. A control switch for the corresponding food compartment has a switch-activating mechanism placed in alignment with the movement of the carriage surface, so that when the carriage surface moves to a predetermined lower position it contacts the switch activator to activate the switch to energize the heating elements of a corresponding toaster/heater compartment. The alignment of the carriage plate surface with the switch-activating member allows for smooth and even contact which reduces wear, tear and stress on the switch activating member.

The invention also provides an improvement in an assembly to engage a carriage assembly and hold it in position to contact the switch activator to hold it in the "on" position. The assembly includes a pivotally mounted claw with an upper surface that is curved and extends at an angle of about 40 to 60 degrees. The claw has a talon with a substantially flat undersurface. The carriage has a projecting member that moves downwardly with the carriage to engage the claw upper surface to pivot the claw out of the path of the projecting member. When the projecting member clears the talon undersurface, the claw is biased to pivot back to its initial position so that the undersurface of the talon overlies the projecting member to engage it and hold the carriage so that it engages the switch activator to hold the switch in the "on" position. The structure allows for smooth engagement and movement of the claw, and for firm locking of position to hold the carriage in place. A handle can be activated to release the claw from engagement with the projecting member so that the carriage can rise to lift food out of the compartment.

BRIEF DESCRIPTION OF THE SEVERAL VIEWS OF THE DRAWINGS

In the drawings.

FIG. 8 is a side elevation of one of the side toaster/heating units;

FIG. 8A is a partial side elevation of a modification of the side toaster/heating unit, FIG. 9 is an end view of the unit of FIG. 8;

FIG. 10 is a side elevation of the opposite side of the unit of FIG. 8;

FIG. 10A is a partial side elevation of the opposite side of the modified unit of FIG. 8A;

FIG. 11 is a side elevation of one of the middle toaster/heating units;

FIG. 11A is a partial side elevation of a modification of the middle toaster/heating unit;

FIG. 12 is an end view of the unit of FIG. 11;

FIG. 13 is an elevation of the opposite side of the unit depicted in FIG. 11;

FIG. 13A is a partial side elevation of the opposite side of the modification of the middle unit of FIG. 11A;

FIG. 14 is an enlarged view of a part of the side toaster/heater unit, taken from FIG. 9, showing a part of a heating element band wrapped around one of the nibs on the heating element board;

FIG. 15 is a section view taken on the line 15—15 of FIG. 4, showing part of the front of the toaster, with part of the rear of the toaster broken away;

FIG. 16 is a schematic of the circuitry of the toaster assembly;

Corresponding reference numerals will be used throughout the several figures of the drawings.

DETAILED DESCRIPTION OF THE INVENTION

Figure 1:
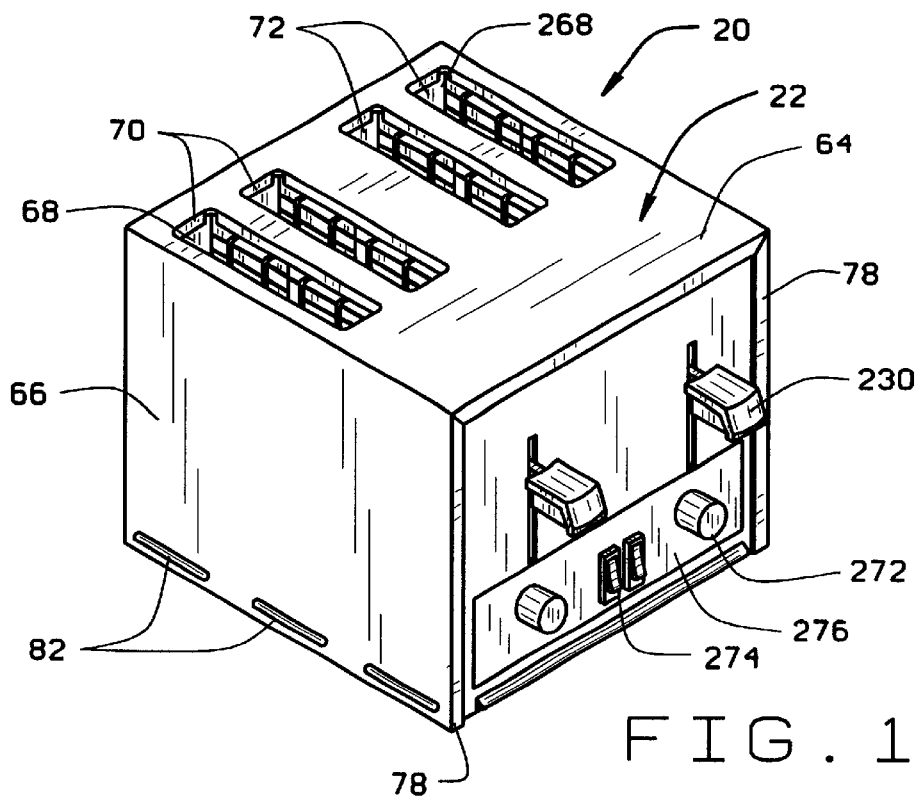
FIG. 1 is an orthogonal projection of the toaster assembly for toasting bread products of the invention.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention.

General Overview

The toaster assembly of the invention is generally depicted as 20. From an over all standpoint, the toaster assembly comprises a housing 22 which within it has an inner frame 24. Toaster assembly 20 further comprises a bread toasting and heating chamber 26 which contains two toaster/heater ensembles 28. Each ensemble 28 comprises a middle toaster/heater unit 32, as seen more particularly and isolated in FIG. 7 and FIGS. 11–13. For each ensemble 28, the unit 32 has to each its sides a toaster/heater unit 34, shown isolated in FIGS. 8–10. Each ensemble 28 comprises a pair of toaster/heating compartments 36.

The toaster assembly 20 further comprises a bread products support assembly 40. Toaster assembly 20 additionally has a controls and circuitry assembly 44.

More Detailed Description

Now for a more detailed description of the toaster assembly 20, the housing 22 comprises a floor 50 supported by four feet members 52 attached as by screws 56. Housing 22 further comprises a back outer wall 58 and a front wall 60. Housing 22 also comprises a top cover casement 62 which generally an inverted "U" shape with a horizontal roof 64. Roof 64 depends at its side edges into vertical side walls 66. The roof 64 has rectangular openings 68 grouped in two pairs 70 and 72, for insertion of bread products into their respective heating/toaster compartments 36. At the bottom edge of each side wall 66 is an inwardly projecting horizontal flange 74. Extending inwardly from the front and rear edges of side walls 66 are L-shaped flanges 78, which are aligned with L-shaped flanges 80 that project inwardly from the front and rear edges of roof 64, respectively. The side walls 66 have vents 82.

Turning now to the inner frame 24 which is generally positioned within the housing 22, the frame 24 comprises a platform 90. The frame 24 includes two inner side walls 94 and 96 which extend vertically relative to platform 90, with the platform 90 secured at its outer edges to each of the inner side walls 94 and 96. Frame 24 also comprises a rear partition wall 98 and a front partition wall 100, each of which are supported on the upper surface of platform 90. The heating chamber 26 is generally within the platform 90, the inner side walls 94 and 96 and the rear and front partition walls 98 and 100.

Focusing now on the details of the shape of the components of inner frame 24, each of the inner side walls 94 and 96 have integral horizontal lower flanges 104 which are secured as by screws to the floor 50. Each of the flanges 104 has secured to its upper surface as by spot welding an angle-shaped strip 106 with two horizontal ledges 108 so that a slot 109 is formed between the flange 104 and the strip 106 to slidingly receive a crumb tray 110 (see FIG. 6). Each side wall 94 and 96 has at its front and rear edges inwardly extending vertical flanges 114, respectively, and have at their upper edges inwardly extending horizontal flanges 118.

The platform 90 has a horizontal sheet deck section 120 which has at its outer side edges depending flanges 122 which are secured to the side walls 94 and 96 as by screws. At the rear edge of deck 120 is a depending vertical flange 124 which is secured to the housing back wall 58 as by screws. At the front edge of deck 120 are a pair of rectangular openings 126, through which extend circuit boards to be described. A pair of downwardly extending vertical flanges 128 extend from the front edge of deck 120, with a rectangular notch 130 formed therebetween. These platform front flanges 128 each have slots 132 which are open at the lower ends and which receive shafts for control knobs to be described. The deck 120 has four large rectangular holes 134 grouped in pairs, which are each aligned with a corresponding toaster/heating compartment 36 and with the slot pairs 70 and 72, respectively, in the cover roof 64. A deck strut 142 extends between each of the holes 134 for each pair 136 and 138.

Figure 5:
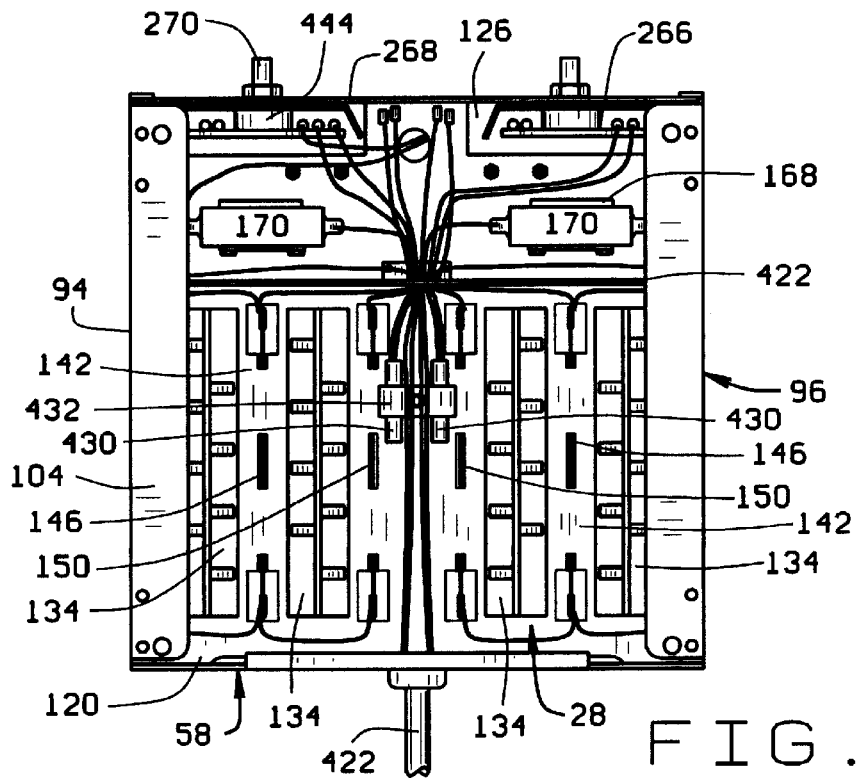
FIG. 5 is a bottom plan view of the toaster assembly of FIG. 1, with the cover casement, floor and crumb tray removed.

The deck 120 has a plurality of openings for mounting the toaster/heater units 32 and 34. There is a rectangular notch 146 located in the center of the struts 142, which receives projecting tabs from the middle toaster/heating units 32, as will be described. To the outside of each of the holes 134 the deck 120 has rectangular notches 150 for receiving tabs from the side toaster/heater units 34, as will be described. There are also larger rectangular deck slots 154 located toward each of the ends of struts 142, and similar sized slots 156 located to the outside of the corners of the holes 134. Each slot 154 and 156 has an inwardly projecting rectangular kerf 160. The slots 154 and 156 receive electrical terminals of the toaster/heater units 32 and 34, as will be described, while the smaller kerfs 160 receive projecting tabs of the toaster/heater units 32 and 34. Near the deck outer side edges are pairs of ventilation passageways 164. Located forwardly from the deck openings 134 are a pair of rectangular openings which have press stamped flanges 168 to which electrical switches 170 are mounted (FIGS. 5 and 15).

Now specific attention is directed to the partition walls 98 and 100. Rear partition wall 98 has a vertical sheet section 172 that has at its lower edge a rearwardly extending horizontal foot flange (not shown) that is secured as by a screw or screws to deck 120. Rear wall 98 has projecting rearwardly from each side edge a horizontal flange 174 that is secured as by screws to the inner side walls 94 and 96. At the upper edge of rear wall 98 is a rearwardly extending horizontal flange 177. Flange 177 has six slits 179 that extend partially into the upper edge of vertical partition sheet 172, which receive mounting tabs of the toaster/heater units 32 and 34, as will be described. The wall sheet 172 also has four vertical slots 181 through which extend bread products support beams 182 to slide to and fro therethrough.

The front partition wall 100 has a vertical sheet section 185 which has four vertical slots 187 that are aligned with corresponding rear partition wall slots 181, and which slidingly receive the front ends of bread support beams 182. The lower end of partition sheet 185 has a forwardly projecting flange 189 that is secured as by a screw to the platform deck 120. Projecting from the outer edges of the front partition sheet 185 are a pair of vertically extending flanges 191 that are secured to the inner side walls 94 and 96 as by screws. At the upper edge of front partition sheet 185 is a forwardly projecting flange 193. Flange 193 has six slits 195 therethrough which extend into the upper edge of sheet 185 and which are aligned with the six slits 179 at the upper end of rear partition wall 98 (see FIG. 4, in particular). Slits 195 also receive mount tabs for the toaster/heater units 32 and 34. The upper front partition flange 193 also has four circular openings to slidingly receive guide rods 196 for the bread support assembly 40. Upper flange 193 also has two sets of a circular opening 197 adjacent a rectangular opening 199 for receiving the hooked end 201 of a helical spring 203 of the bread support assembly 40.

Figure 6:
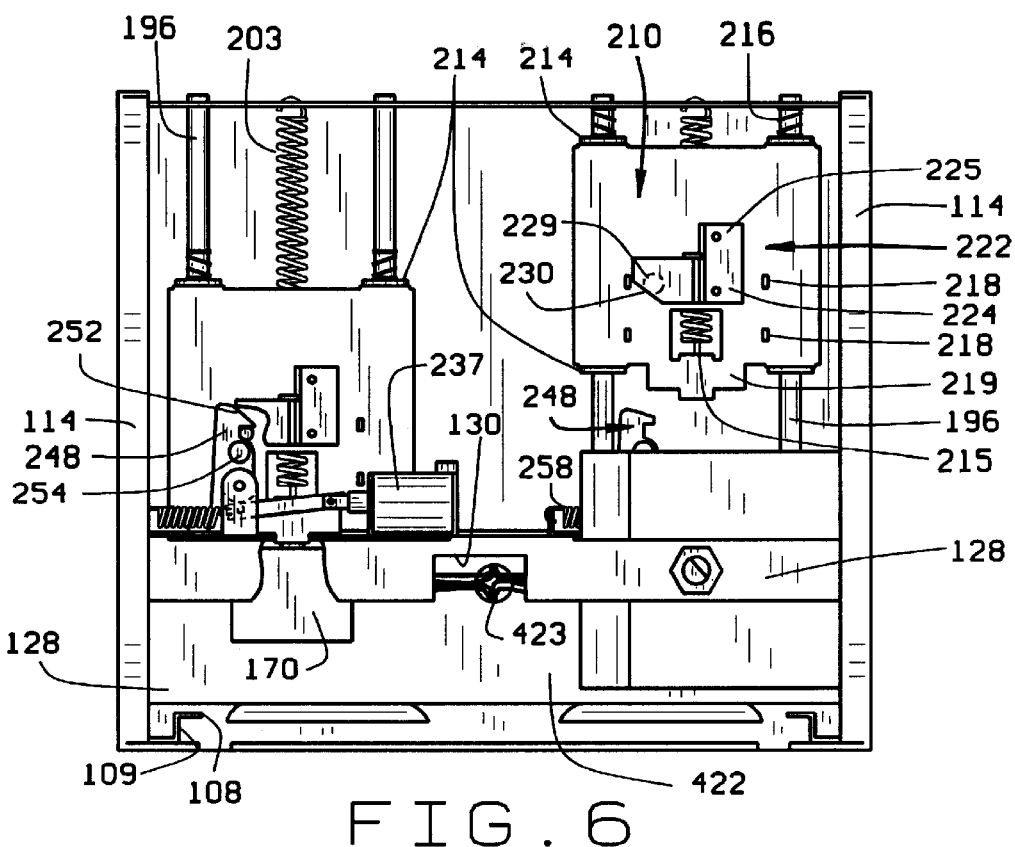
FIG. 6 is a front plan view of the toaster assembly of FIG. 1, with the front cover removed, with the interior circuit board and circuit board cover to the left side shown removed, and with part of the mount platform and the handle on the left side shown removed. The bread products support on the left side is shown in the down position, while the bread products support on the right side is shown in the raised position.
Figure 7:
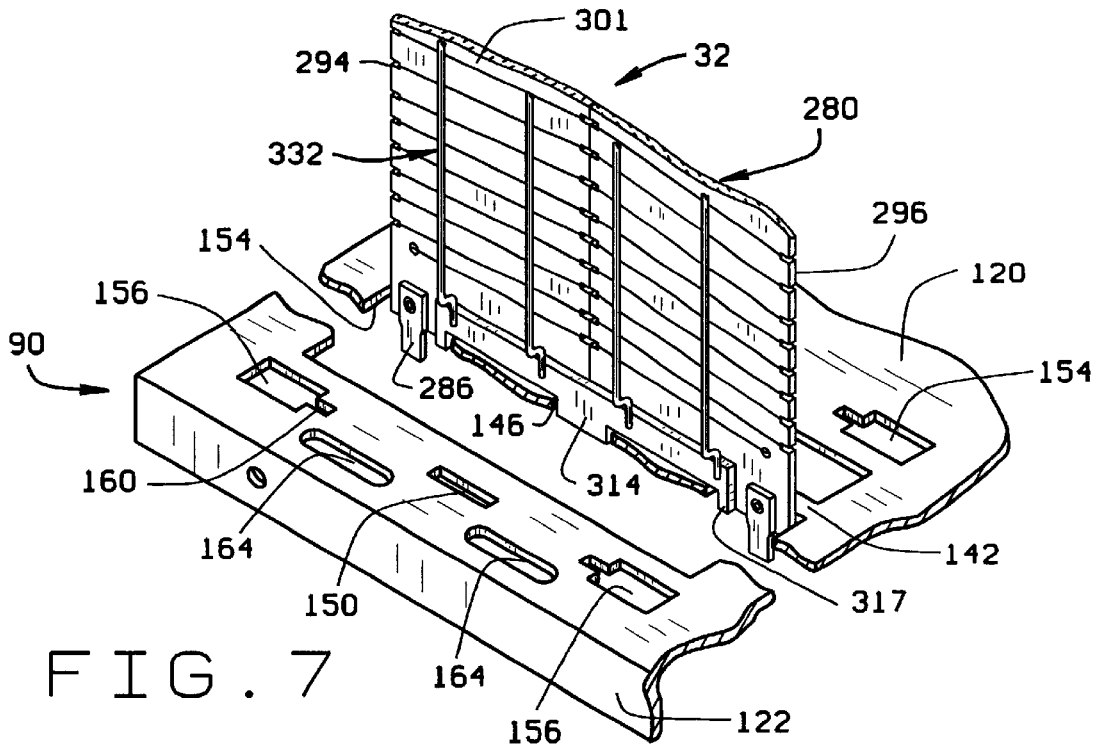
FIG. 7 is a partial view of the mount platform, shown broken, and one of the middle toaster/heating units.
Figure 17:
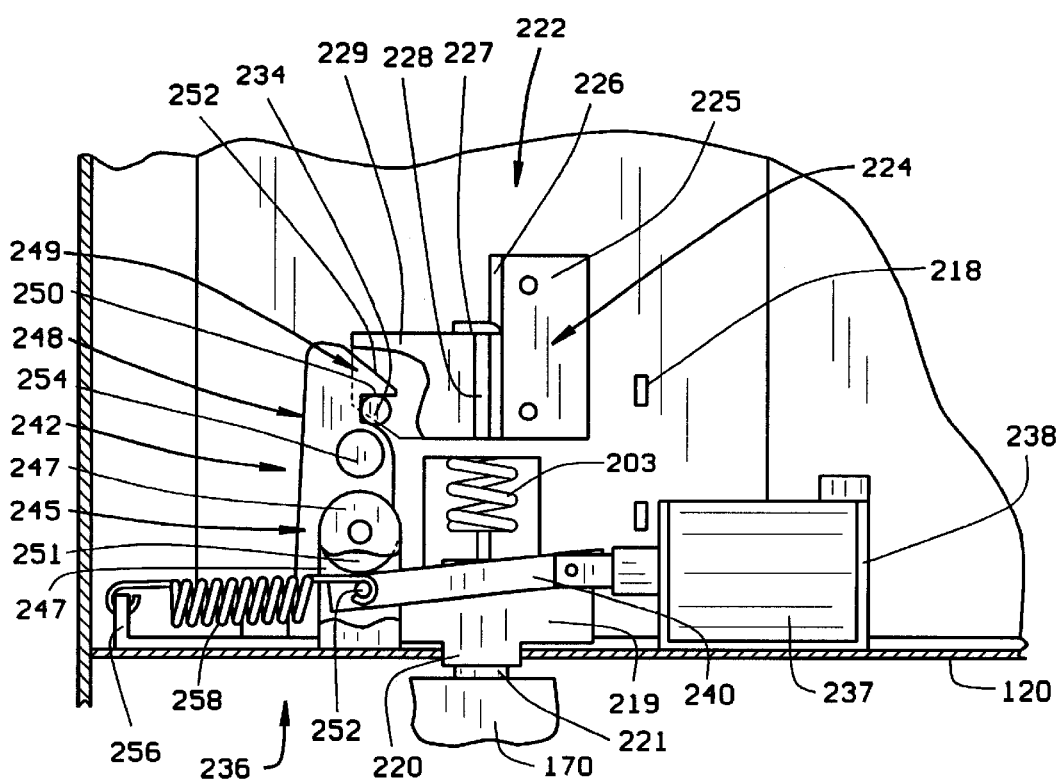
FIG. 17 is an enlarged view of the left central part of the front plan view of FIG. 6, with some parts shown broken.

In addition to bread support beams 182, each bread support assembly 40 comprises a carriage assembly 210, a description of one being sufficient to describe the other. Each assembly 210 has a carriage plate 212. Carriage plate 212 is vertically oriented, and has extending rearwardly from both ends of its upper edge and of its lower edge a pair integral of horizontal flanges 214. Each flange 214 has a circular bore to slidingly receive a corresponding guide rod 196. Carriage plate 212 has a rear extending ledge 215, formed as by stamp press. Ledge 215 has a hole through which the bottom hooked end of spring 203 extends to be thereby engaged. Coiled springs 216 with washers can be mounted above upper flanges 214 about guide rods 196 to act as shock absorbers against partition upper flange 193. Along each side edge of carriage plate 212 is a rear extending flange 217. Washers can also be mounted below the lower flanges 214. The front ends of support beams 182 have forked ends with tongues 218 that pass through holes in carriage plate 212, to be twisted on the front side of plate 212 to hold the beams 182 fixed. The carriage plate 212 has projecting from its bottom a rectangular extension 219, which at its bottom has a rearwardly extending horizontal toe flange 220. When the carriage 210 is in the lowermost position (as seen in FIGS. 6 and 17), toe 220 presses against a button 221 of switch 170 to place the switch in the "on" position as will be later described.

Carriage assembly 210 has a handle 222. Handle 222 has an "L"-shaped proximal section 224, which comprises a flat flange 225 that bends into a beam section 226. The flange 225 is secured by rivets to fit flush against the front surface of carriage plate 212. The beam section 226 has a transverse stop flange 227. Handle 222 also has an "L"-shaped distal section 228 having a transverse wing 229 with a beveled lower corner 230. Distal handle section 228 is pivotally connected by a pin to handle beam 226. The distal handle section 228 extends through a vertical slot in front wall 60.

The stop 227 resists counter-clockwise pivotal movement (as viewed looking at FIG. 15) of the distal section 226 from its FIG. 15 position, when the handle is moved downwardly.

A plastic handle grip 232 is mounted to the distal end of distal sections 228, as by screws. A cylindrical hook engagement pin 234 is secured to carriage plate 212 to extend forwardly therefrom. Each carriage assembly 210 thus can slide vertically along guide rods 196, and is biased upwardly by spring 203.

A pair of trip/linkage assemblies 236 act to selectively engage and disengage each carriage assembly 210. A description of one assembly 236 is sufficient. Assembly 236 comprises a solenoid 237 mounted as by a "U"-shaped bracket 238 to the upper surface of platform deck 120, as illustrated in FIGS. 2, 4, 6, 15 and 17. Each solenoid 237 has a link pin 240 pivotally mounted to a "U"-shaped bracket that is connected to the solenoid operating shaft. The trip/linkage assembly 236 further comprises a pivoting hook arrangement 242. Arrangement 242 comprises a claw mount bracket 245 with two upright flanges 247, the bottom flat part of the bracket 245 being secured as by screws to deck 120. As shown more specifically in FIG. 17, arrangement 242 has a pivoting claw 248 having an upstanding body with a hooked upper talon end 249 having a substantially flat lower surface 250, and a mid-projecting horizontal sleeve 251. The upper surface 252 of talon 249 is shown extending at an angle of about forty degrees relative to the horizontal component of the frame, but the angle can range from about thirty to sixty degrees. Sleeve 251 is mounted as by a pin extending therethrough, that is held between the uprights 247 so that claw 248 pivots thereabout. Beneath the sleeve 251, the claw 248 has a projecting pin 252 that extends through a hole in the distal end of solenoid link pin 240. Above the sleeve 251, claw 248 has projecting forwardly therefrom a claw disengagement lug 254.

The claw mount bracket 245 also has an upwardly projecting flange 256 located to its left end (as viewed looking at FIG. 4), to which one hooked end of a coiled spring 258 is secured. The other hooked end of the spring 258 fits in a groove about the lower claw pin as shown in FIG. 17. When the carriage assembly 210 is moved downwardly by handle 222, the claw talon 249 first is pivoted away from carriage pin 234 as that pin presses against the curved upper end of talon 249, until the pin 234 is moved to be lower than talon 249. Then the claw 248 is urged by spring 258 to cause talon 249 to pivot toward pin 234 so that talon 249 is directly above pin 234. When that occurs, talon 249 engages the carriage pin 234 to hold the carriage 210 in the down position, shown to the left of FIG. 6, to thus hold the bread support beams 182 in the lower position. The bread, bagel or the like is thereby held within the corresponding toaster/heating compartments 36.

Handle grip 232 can be moved upwardly to pivot handle section 226 so that its beveled edge 230 presses downwardly and outwardly against the claw lug 254 to pivot claw 248 counter-clockwise (viewed looking at FIGS. 6 and 17) to move talon 249 to disengage from pin 234. The spring 203 then urges the carriage assembly 210 and the bread support beams 182 upwardly. The toast, bagel or the like are likewise moved upwardly for removal through openings 68.

Figure 4:
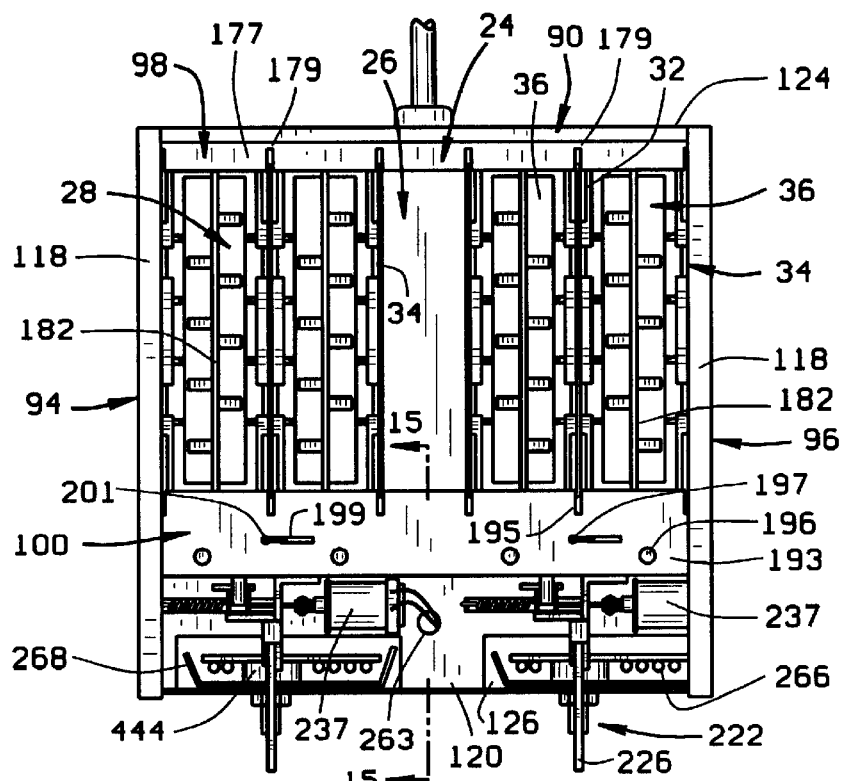
FIG. 4 is a top plan view of the toaster assembly of FIG. 1, with the top cover casement removed.

The solenoid wires extend through circular passageways in the deck 120, one such hole being shown as 263 in FIGS. 4 and 5. A pair of circuit boards 266 having protective covers 268 are mounted within the deck openings 126. A circuit control rod 270 for a timer to be described, extends through notch 130 of platform front flange 128, and is secured thereto as with a nut and washer to extend through openings in front wall 60. Control knobs 272 are mounted to rods 270 to the front of wall 60 (FIG. 1). Mounted to front wall 60 and extending through rectangular openings therethrough are a pair of toggle switches 274. Switches 274 each have a plug that extends to the rear side of front wall 60 to be connected to its corresponding circuit board 246. A label plate 276 can be secured to the front wall 60 between wall 60 and the knobs 272.

Now attention is directed to the toaster/heater ensembles 28 which comprise the middle toaster/heater units 32 and their corresponding pair of side toaster/heater units 34. First, with reference to the middle units 32, one is shown isolated in FIGS. 11–13. The two units 32 are identical, so a description of one suffices. Each unit 32 comprises a vertically oriented heating element board 280 made of insulating material such as mica. Board 280 has at its lower ends a pair of terminal assemblies 282. Each terminal assembly 282 comprises a lower terminal plate section 286 which depends below the bottom edge of board 280 (FIGS. 11 and 12), and an upper plate section 288 (FIG. 13) on the opposite side of board 280. Terminal sections 286 and 288 have flat, longitudinal surfaces which abut the opposite surfaces of board 280. The sections 286 and 288 are secured to each other by electrically conducting rivets 290 which extend through openings in board 280. It can be seen that the two terminal assemblies 282 are spaced from one another so that their only common connection is with the non-conductive board 280.

The board 280 has at its outer edges a plurality of notches 294, with a plurality of projecting nibs 295 therebetween. In the center of board 280 are a plurality of rectangular holes 287. At the top central part of board 280 is a semi-rectangular notch 290 which forms a "T"-shaped tab 292. FIGS. 11–13 show the board 280 formed of two identical half sections 296 and 298. The rectangular holes 287 and the portions of the slot 290 can thus be formed at the edges of sections 296 and 298 before those sections are assembled together.

The unit 32 has an electrical heating element band 301. Band 301 has two ends, each of which extends through an opening in board 280 to be connected to the inside surface of its corresponding terminal plate 288. From the connection to terminal sections 288, the heating element band 301 winds back and forth through the notches 294 on one edge (e.g., the right edge of FIG. 13) of board 280 and through the central holes 287. With such winding, when the band 301 reaches the top notch 294, it extends therefrom as illustrated in the drawings FIGS. 11–13 to pass through the central slot 290 underneath the arms of the central "T" tab 292. The uppermost strand of the band 301 extends along the surface of the board shown in FIG. 11, and then has its central portion extending through slot 290 to pass over the trunk of "T" tab 292 as viewed in FIG. 13. The top strand of band 301 thence extends to the top notch 294 to the left side of board 280 (as viewed looking at FIG. 11) and winds downwardly through the notches 294 on that edge of board 280 and through the central holes 290. The winding continues until the band 301 connects with the terminal plate 288 toward the bottom of board 280. It can thus be seen that the band 301 winds about board sections 296 and 298 so that strips of band 301 extend along both sides of board 280.

The toaster/heater unit 32 further comprises lower and upper bread guide supports 304 and 305. The lower supports 304 comprise a pair of plates 310 which have inner surfaces that abut the exterior surfaces of the lower end of board 280. The lower plates 310 are secured to each other by rivets that extend through board 280. The plates 310 have central mounting plugs 314 that extend downwardly, with a similarly shaped corresponding portion of the board 280 located therebetween. At the ends of each plate 310 are depending legs 317 which are likewise separated by board 280. When unit 32 is mounted to the platform deck 120, the central plug 314 fits snugly within the rectangular notch 146 in deck 120. The terminals 262 extend through the deck slots 154 so that the support legs 317 extend within the kerfs 160 of slot 154.

The upper bread guide support 305 likewise has a pair of plates 320 sandwiched about the upper edge of board 280, and connected as by rivets that pass through board 280. The supports 304 and 305 thus hold the two board sections 296 and 298 in fixed position. The upper plates 320 are angles as seen in FIG. 12, with upper flange shoulders 324 that project outwardly. Each shoulder 324 has a pair of "C"-shaped recesses 328. At each of the outer ends of support plates 320 are projecting lugs 330 which are received within the corresponding partition wall slits 179 and 195.

A pair of rigid bread guides 332 are mounted on each side of each unit 32. The bread guides 332 are generally of a bent "U" shape and have two "L"-shaped lower ends 334, the lower toes of which are secured as by spot welds to support plates 320. From ends 334, the guides 332 bend to extend upwardly into parallel longitudinal rods 336. At the upper ends of rods 336, the guides 332 extend inwardly into "U"-shaped bite sections 338 which are secured as by spot welding to mount support plates just below recesses 328. The recesses 328 allow for convenience in performing such spot welding.

Next addressed are the toaster/heater units 34 located to the outside of each of the middle units 32, and shown isolated in FIGS. 8–10. Each unit 34 comprises a heater element mounting board 350 made of non-conductive material such as mica. Board 350 has a first flat side 351 and a second opposite flat side 352. The board 350 is divided into two sections 353 and 354 which are mirror images of each other. Board 350 has at its lower ends a pair of terminal assemblies 357. Each assembly 357 comprises a lower terminal plate 359 which depends below the bottom edge of board 350, and an upper terminal plate 361. Terminal sections 359 and 361 have flat surfaces which abut the flat surfaces of board sides 351 and 352. Terminal sections 359 are secured to sections 361 by electrically conductive rivets which pass through openings in board 350. The two terminal assemblies 357 are separated from each other with the only common connection being with the non-conductive board 350.

The board 350 has at its outer edges a plurality of notches 364, and a plurality of projecting nibs 366 projecting therebetween. In the center of board 350 are a plurality of rectangular holes 369. At the top center of board 350 above the uppermost hole 369, is a generally "T"-shaped slot 372. Slot 372 has a central trunk opening that branches at its top into two hook-shaped limb slots 374 to form arm lugs 377 within the limb slots 374. It can be seen that this described configuration differs from the slot 290 and the "T" tab 292 for the unit 32 shown in FIGS. 11–13. The "T"-shaped portion for unit 34 depicted in FIGS. 8–10 is the void in the board 350, while for unit 32 in FIGS. 11–13 the "T"-shaped portion is the solid part of the board 280.

Unit 34 also has a heating element band 378. Band 378 has two ends which are connected to corresponding terminal plates 359. From the connection to terminal plate 359 located to the right edge of board 350, the band 378 winds back and forth from the notches 364 on one side of board 350 (e.g., the right side as viewed looking at FIG. 8) to pass through the central board holes 369. In so doing, the band 378 passes from a notch 364 along the surface of the board side 351 which is in view in FIG. 8, to and through a central opening 369. From that opening 369, the band 378 passes upwardly around the other board side 352, as seen in FIG. 10, and thence passes through the next hole 369 located thereabove back to board side 351. From there, band 378 passes along board side 351 back to a notch 364 where the band next loops around the nib 366 thereabove to pass over back side 352 (FIG. 10) and thence back through the notch 364 thereabove. Following this, the band 378 extends back along the surface of board side 351 back to the central hole 369 and thence up to the next uppermost hole 369. Thence, the band extends back to a notch 364, and so forth.

The enlarged view of FIG. 14 shows the band 378 extending along board side 351, then passing through one notch 364a and thence looping around the board side 352 about adjacent nib 366, and then pass through a notch 364b thereabove to extend along the board side 351. After band 378 passes through the uppermost notch 364 to the right of FIG. 8, it extends along the surface of board side 351 toward the central "T" slot 372 and passes through the right limb slot 374 beneath the right lug 377 (as viewed looking at FIG. 8) Band 378 then passes over the other board side 352, to pass across the trunk of slot 372 to continue along side 352 until it passes through the left limb slot 374 beneath the left lug 377. Band 378 then extends along board side 351 to the uppermost notch 364 in the left edge of board 350. From there, the band 378 loops to the other board side 352 about the uppermost left nib 366 and then passes through the next lowest notch 364 back to pass along board side 351. Band 378 next passes through the trunk void of slot 372 at its bottom, back around board side 352 and thence through the board opening 369 directly beneath "T" slot 372. From there the band 378 extends back to the same notch 364 from whence it last came, back around nib 366 and then along side 351 through the same hole 369. Then the band extends along the board side 352 to pass through the next lowest central hole 369 back along board side 351 to repeat the pattern. After the pattern is repeated through the bottom hole 369 and bottom notch 364, the band 378 extends to its connection with terminal plate 359 on the left side of FIG. 8.

The "T" slot 372 arrangement described is believed to be the preferred form for effecting the crossover of the element band 378 from one outer edge of the board 350 to the other outer board edge. However the band crossover can also be achieved by having rectangular slots beneath the arm lugs 377, without a central trunk opening and without the branching slots extending above the arm lugs 377. Circular holes or other openings could be used instead of such alternate slots. The crossover can also be accomplished by the band 378 passing from the upper notch 364 in the board outer edge to the right of FIG. 8 to extend along the surface of board side 351 to pass through the upper notch 364 on the left outer board edge, without passing along the surface of the other board side 352. With such alternate arrangements almost all of the band 378 likewise extends on the surface of board side 351, with little extending along the surface of side 352.

The unit 34 has a lower and an upper bread guide support plate 381 and 384, respectively. Both plates 381 and 384 are secured to be on the first side 351 of board 350. Unlike unit 32, with the unit 34 there are no bread guide support plates on the opposite side of the heating element mount board. Lower support plate 381 has an inner surface that abuts the exterior surface of board side 351. Lower plate 381 is secured by a plurality of rivets that extend through board 350. Plate 381 has a mounting plug 386 that overlies a similarly shaped part of board 350. At both ends of plate 381 are depending legs 389 which overlay board 350. When unit 34 is mounted to the platform deck 120, the central lug 386 snugly fits within a corresponding rectangular notch 150 in deck 120. The terminals 357 extend through the deck slots 156 so that the support legs 389 extend within the kerfs 160 of slot 156.

Rivets passing through board 350 secure the upper guide support 384. The supports 381 and 384 thus hold board sections 353 and 354 in fixed relationship. The upper plate 384 is an angle with an upper flange shoulder 392. The shoulder 392 has a pair of "C"-shaped recesses 394. At the outer ends of support plate 384 are projecting lugs 396, which are received within the corresponding wall slits 179 and 195, and bent outwardly to hold the units in place.

A pair of bread guides 400 are mounted to the supports 381 and 384. The guides 400 have the same bent "U" shape as the guides 332 of units 34. The lower guide "L"-shaped ends 402 are secured to lower support plate 381 as by spot welding. The parallel rods 404 extend upwardly into "U" bite sections 407 secured by spot welding to upper plate 384 just beneath the recesses 394.

For unit 34, it can be seen that the longer strips of heating band 378 are on the board side 351 that faces the viewer in FIG. 8 so that the heat radiating therefrom radiates from that side. The opposite board side 352, viewed in FIG. 10, thus has on its surface only the loop around portions of the band 378 as it wraps around the nibs 366 and about the board 350 located between the holes 369, and as it extends behind "T" slot 372. With such an arrangement, the energy dissipated through the heating bands 378 for the side units 34 radiates overwhelmingly toward the bread, bagel or the like located in the heating compartment 36 between the unit 34 and 32.

Reference is now made to the modifications shown in FIGS. 8A and 10A. This modification features a different terminal arrangement. Rather than having terminal plates on both sides of the board 350, as in FIGS. 8–10, the modification of FIGS. 8A and 10A shows a non-pivotal terminal plate 359m secured to board side 351 by at least two rivets R1 and R2. The band 378 is connected to plate 359m toward the top thereof and to the upper rivet R1.

In the modification of FIGS. 11A and 13A the terminal 286m is a flat plate mounted to one side of board 280 by a pair of rivets R3 and R4. The band 301 is connected to plate 286m toward the top thereof and to rivet R3. It can be seen that the terminal plates 359m and 286m are longer than their counterparts in FIGS. 8–10 and FIGS. 11–13, respectively, to better accommodate fastening by a pair of rivets. The mounting by the pair of rivets as shown helps to resist pivotal movement of the terminal plates relative to the heating element board to which it is mounted.

Secured to the bottom of deck 120 is a circuit barrier partition 420. Partition 420 has a vertical wall 422 with a hole 423 therethrough for passage of electrical circuit wires. A flange 424 extends from the top of wall 422. Flange 424 has notches to receive screws to secure it and barrier 420 to the underside of deck 120. The barrier 420 acts to shield heat from emanating from the heating units 32 and 34 beneath deck 120, from the electrical circuit components to the front side of barrier 420. A pair of temperature sensing thermistors 430 are secured to the underside of deck 430 by a bracket 432 and screw.

Now a description of the electrical circuitry will be given, with more particular reference to FIG. 16. The circuitry 434 is schematically illustrated in FIG. 16 for accommodating one of the toaster/heater ensembles 28 to thus operate with one of the control knobs 272, and a corresponding control switch 274. The circuitry 434 also cooperates with a handle 222 and knob 230, and a corresponding switch 170. The control switch 170 is illustrated schematically toward the top of FIG. 16. The heating band 301, which extends about both sides of the board 280 of toaster/heater unit 32, is shown toward the bottom of FIG. 16. The bands 378 for each of the two corresponding side toaster/heater units 34 are also depicted in FIG. 16. The electrical connection of those bands to switch 274 is also illustrated. Circuit 434 has an electrical timer 444 shown schematically in FIG. 16, and also shown mounted to the circuit board 266 in FIGS. 4 and 5. One of the solenoids 237 is also illustrated in FIG. 16 as part of circuit 434. Circuit 434 further comprises one of the thermistors 430 which is electrically connected to the corresponding timer 444. The timer 444 and thermistor 430 are commercially available from SSAC, Inc. of Baldwinsville, N.Y. under Model No. TT, dependent upon application.

When the handle knob 230 is pressed downwardly, downward force is exerted against the distal end of distal handle section 228 so that its upper edge at its proximal end presses against the stop 227 of proximal handle section 224. This action translates into moving the carriage 210 downwardly so that the carriage toe 220 presses against button 221 on switch 170 to close the circuit 434 and place the circuit in the "on" position. When the handle 222 is in the upper position, such as shown to the right of FIG. 6, the switch 170 is "off" and the circuit 434 is open, so that the heating units 32 and 34 cannot be energized.

The switch 274 has multiple positions. In a first "Toast" position, the switch 274 is electrically connected to the bands 378 for both of the side units 34, as well as connected to the band 301 of the middle unit 32. In this "Toast" position, the heating bands 301 and 378 radiate heat toward both sides of the bread product within each of the corresponding compartments 36. Switch 274 can also be placed in a second "Bun" position, which opens the circuit connection with the side heating bands 378, so that the only electrical connection is to the band 301 of the middle unit 32. In this position, only one side of the bread product in a compartment 36 is toasted or heated. For example, a bagel or bun can be centrally sliced and placed so that its open face in each compartment 36 is directed toward one of the two sides of middle unit 32 so that the band 301 radiates heat against both open faced bun or bagel sides. In such position, the two bun or bagel halves would be facing each other as they are placed through the corresponding openings 68 in to the compartments 36.

The control knob 272 can rotate its corresponding rod 270 of timer 444 to select a time for energization of the heating units 32 and 34 to heat or toast the bread product to the desired degree. The thermistor 430 acts to compensate for cold toaster start-up. The thermistor 430 senses the temperature near compartments 36, so that for the same dial setting for knob 272, the length of the time for energization of the units 32 and/or 34 is longer when the compartments 36 are initially at a colder temperature, as opposed to being initially at a hotter temperature as wherein the compartments 36 have just been used to toast or heat.

When the set timing cycle has expired, the timer 444, which is electrically connected to solenoid 237, energizes the solenoid 237 to pull the solenoid link pin 240 towards the solenoid 237 (toward the right of FIGS. 6 and 17). This action thereby pivots claw 248 in a counter-clockwise direction to pivot the talon 249 away from engagement with the carriage pin 234. This allows the spring 203 to move the carriage assembly 210 upwardly so that the toasted/heated bread products are removed from the compartments 36.

If desired at any point the handle knobs 230 can be pressed upwardly so that the beveled handle surface 230 presses against pin 254 to pivot the claw 248 away from engagement with pin 234. This then allows the spring 203 to urge the carriage assembly 210 upwardly to bring the bread products out of the compartments 36 prior to the action by the timer 444 and thermistor 230 to disengage the carriage 210.

Figure 3:
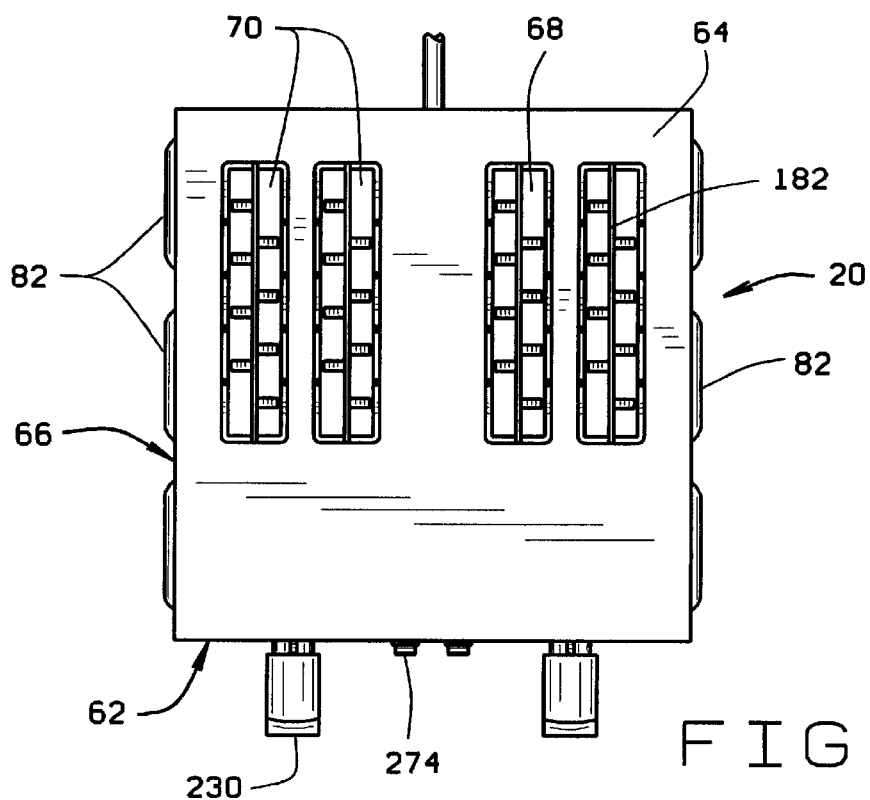
FIG. 3 is a top plan view of the toaster assembly of FIG. 1.
Figure 2:
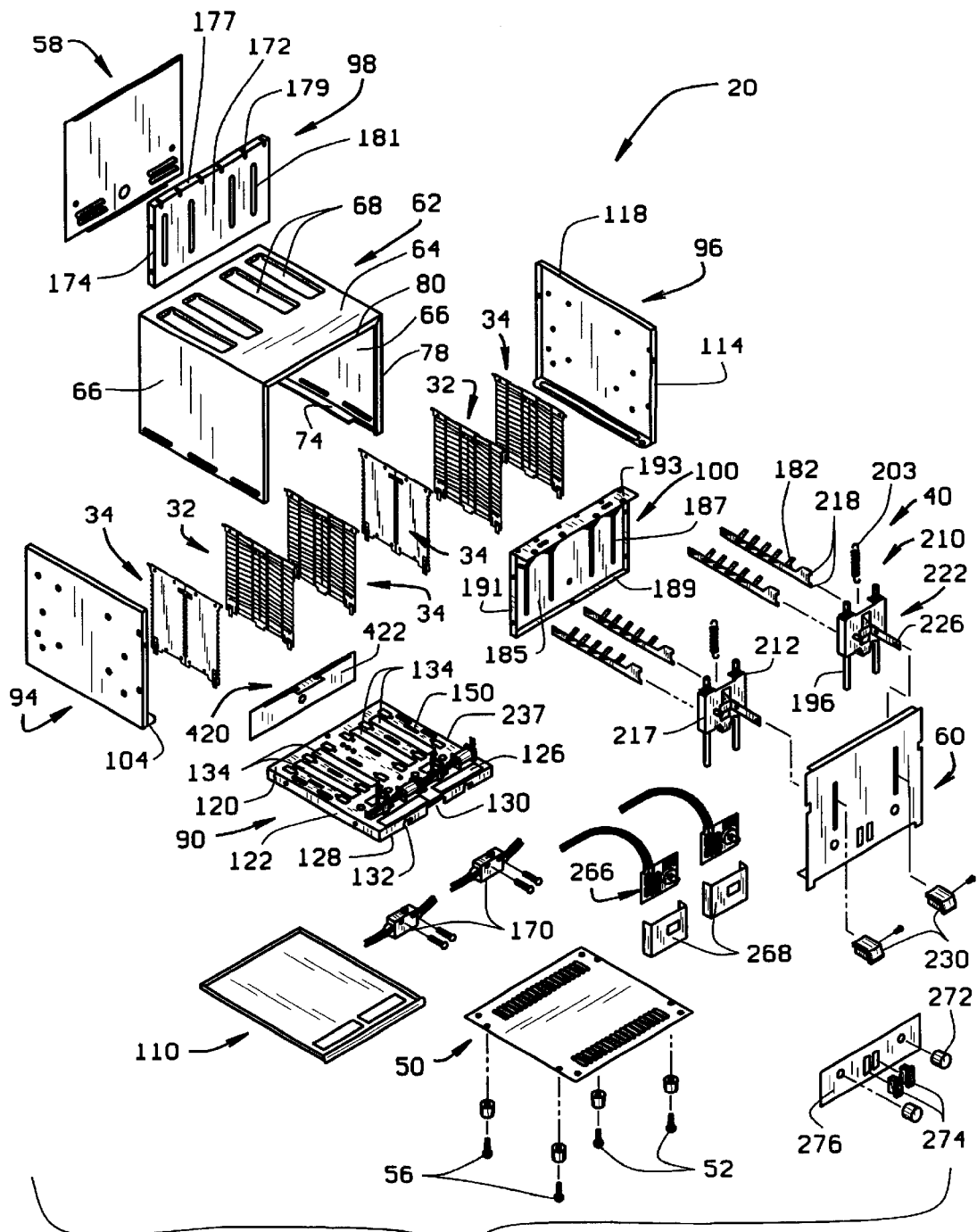
FIG. 2 is an exploded view of the toaster assembly of the invention.

In operation of the heating ensembles 28, when the bread products are lowered into the heating compartments 36, the middle heating unit 32 radiates heat outwardly towards the bread in both of the compartments 36. The middle unit 32 radiates head outwardly from both of its sides towards the two compartments 36 between which it is located. The two side units 34 radiate heat outwardly from their board sides 351 toward the adjacent heating compartment 36. Hence, when viewing the compartments 36 corresponding to the toaster assembly roof openings 72 to the right of FIGS. 1, 3 and 4, the heat from the rightmost side unit 34 located next to frame inner side wall 96, is radiated overwhelmingly toward the heating compartment 36 rather than toward the wall 96. This distribution of radiant heat reduces the heat level of the exterior housing 22 of the toaster assembly 20. Likewise, for the other side unit 34 located toward the middle of the frame 24, the heat is radiated overwhelmingly from the board side 351 directed to the bread in compartment 36, while little heat is unnecessarily spent radiating from the opposite board side 352 which faces the board side 352 of the other more centrally located side unit 34. This likewise avoids unnecessary generation of heat in the central part of the frame 24 to thus minimize the temperature of the housing 22. This effective distribution of radiant heat allows for a more compact toaster assembly as less material and space is needed to serve as a heat sink for unnecessarily dissipated heat.

In operation, the rigid bread guides 332 and 400 of units 32 and 34, respectively, act to keep the bread products within chambers 36 from getting closer to the heating element boards 280 and 350, than the distance between those bread guides and their respective heating element boards. The fixed position of the bread guides with respect to their respective heating element boards thus provides an assembly that promotes uniformity in toasting or heating of the products within compartments 36. Moreover, the connection of the bread guides 352 to the upper and lower support plates 304 and 305 for unit 32, and of bread guides 400 to upper and lower plates 381 and 384, respectively, for unit 34, give the units 32 and 34 good rigidity to resist their being bent by forces as they are handled in assembly and installation. The units can be easily grasped during handling by grasping the bread guide rods. The structure of the units 32 and 34 thus mitigates against too great a force being exerted against the heating element boards themselves, but allows for transfer of force to the support plates and bread guides. The lugs 314 and 386 and feet 317 and 389 at the bottom of units 32 and 34, and their corresponding openings in deck 120, allow of ease of installation of the units 32 and 34, as well as stability of mounting. At the upper end of the units 32 and 34, the lugs 330 and 396, respectively, inserted in the corresponding openings in the partition walls, likewise allow for ease of installation and stability once installed.

It can be seen that for the outside heating unit 34 that the width of the slots 364 is wider toward the top of the board 350 than at the bottom of board 350, and the width of the nibs 366 is likewise wider toward the board top than at the bottom. This allows for the windings of the band 378 to be closer together toward the bottom of the board 350, with a gradual increasing of the distance between the winding strips of band 378 as the band winds towards the top of the board 350. With this arrangement there is a greater concentration of heat radiating from the surface of board side 351 in the lower areas where the band 378 windings are more closely spaced, than toward the upper ends of board side 351. This arrangement helps to balance the heat distribution toward the bread product to accommodate for the convection heat flow from the bottom of the compartment 36 toward the upper end of the compartment 36 and out of the openings 68.

With the middle unit 32, the width of the nibs 295 progressively increases from the bottom of board 280 toward the top of board 280. As a result, the strips of the band 301 as it winds about board 280 are closer to each other toward the bottom of the board, and the space between the strips of band 301 progressively increases toward the top of board 280. This arrangement likewise compensates for heat distribution by convection toward the top of board 280.

In view of the above, it will be seen that the several objects and advantages of the present invention have been achieved and other advantageous results have been obtained.

As various changes could be made in the above constructions without departing from the scope of the invention, it is intended that all matter contained in the above description or shown n the accompanying drawings shall be interpreted as illustrative and not in a limiting sense.

What is claimed is:

1. A toaster/heater assembly for toasting and heating food products, comprising:

(a) a housing;

(b) a frame within the housing;

(c) a toaster/heater unit mounted in association with a frame, the toaster/heater unit comprising a board of insulating material having a bottom and a top, and a first side and a second side;

(d) the toaster/heater unit comprising a heating element mounted in association with the board for radiating heat toward food products placed within the housing; the heating element having first and second ends;

(e) the toaster/heater unit comprising a food guide associated with the element board, the food guide having a first end and a second end, means for mounting the first end of the guide in association with the board and means for mounting the second end of the guide in association with the board, the guide being shaped to project outwardly from its mounting in association with the board to be spaced from the surface of the board and spaced from the heating element to help prevent bread or other food placed within the frame from contacting the heating element while allowing radiant heat emitted from the heating element to pass around it to strike against food products placed in the frame.

2. The toaster/heater assembly of claim 1 wherein the guide comprises a rod, with the first end of the rod mounted in association with the board near the top of the board, and the second end of the rod mounted in association with the board near the bottom of the board.

3. The toaster/heater assembly of claim 1 wherein the food guide comprises a pair of rods joined together by a bite section, each rod having an end, means for mounting the bite section to the board, and means for mounting the ends of the rod to the board.

4. The toaster/heater assembly of claim 3 wherein the bite section is mounted near either the top or the bottom of the board, and the rod ends are mounted to the other of the top or the bottom of the board.

5. The toaster/heater assembly of claim 2 further comprising an upper support plate mounted toward the top of the board, and a lower support plate mounted toward the bottom of the board, and wherein the first end of the rod is mounted to the upper support plate and the second end of the rod is mounted to the lower support plate.

6. The toaster/heater assembly of claim 3 further comprising an upper support plate mounted toward the top of the board, and a lower support plate mounted toward the bottom of the board, and means for mounting the bite section of the food guide to one of the first or second support plates, and means for mounting the rod ends to the other of the upper or lower support plate.

7. The toaster/heater assembly of claims 5 or 6, wherein the bottom support plate has a mounting plug that extends downwardly therefrom, and further has a first depending leg located and spaced from said plug to one side of the plug, and a second depending leg located and spaced from the plug to the other side of said plug;

the frame having a platform with a deck section, the deck section having a hole sized to receive the plate plug, the platform deck also having a first kerf sized to receive the first plate leg, and having a second kerf sized to receive the second plate leg, so that the interaction between the plug and legs with the deck helps to stabilize the mounting of the board relative to the deck.

8. The toaster/heater assembly of claim 5 or 6, wherein the upper support plate has outer ends with a lug projecting from each outer end, the frame comprising a pair of partition walls, each wall having a slit sized to receive its corresponding projecting lug to help hold the board in a fixed position relative to the frame.

9. The toaster/heater assembly of claim 8 wherein the projecting lugs extend through their corresponding slits, and a part of each lug that extends beyond the slit is bent to one side to better retain the position of the upper plate relative to the partition walls.

10. The toaster/heater assembly of claim 1 comprising a first upper support plate and a second upper support plate, each of which is mounted toward the top of the board, the first upper support plate being mounted to the first side of the board, and the second support plate being mounted to the second side of the board opposite the first side of the board, the outer ends of the first and second support plate each having a projecting lug, the frame comprising a pair of partition walls, each wall having a slit sized to receive each projecting lug, the lugs from each end of the first and second support plates being bent away from each other at a point past the slit to help retain the position of the support plates and board relative to the frame.

11. The toaster/heater assembly of claim 1 further comprising a first terminal mounted to a side of the board near the bottom of the board, the first end of the heating element being an electrical connection with the first terminal, the first terminal being mounted to the board at a first point and at a second point, so that the mounting at the two points resists pivoting of the terminal relative to the board.

12. The toaster/heater unit of claim 11 further comprising a second electrical terminal, the second terminal being mounted to the board at a point laterally spaced along the board from the first terminal to be separate from the first terminal, the terminal being mounted to the board at a first point and at a second point to resist pivoting of the first terminal relative to the board, the second end of the heating element being in electrical connection with the second terminal.

13. The toaster/heater assembly of claim 12 wherein the frame has a platform with a deck section, the deck section having a first hole and a second hole, each of the first and second terminals having a portion that extends beneath the board so that the said portion of the first terminal extends through the first hole to extend beneath the platform deck, and the said portion of the second terminal extends through the second hole to extend beneath the platform deck.

14. The toaster/heater assembly of claim 12 wherein the first terminal is secured to the board by an upper securing member and a lower securing member spaced from one another, and wherein the second terminal is secured to the board by an upper securing member and a lower securing member which are spaced from one another, and wherein the first end of the element is electrically connected at the upper securing member of the first terminal, and wherein the second end of the heating element is connected to the upper securing member of the second terminal.

15. The toaster/heater assembly of claim 6 wherein the upper support plate has an angle-shape including an upper flange shoulder that projects outwardly from the board, the flange having a recess, the bite section of the rod being mounted to the upper support plate at a location beneath the recess.

16. The toaster/heater assembly of claim 1 wherein the board has first and second edges, and the first and second board sides each have surfaces, the first board edge has a series of notches with nibs formed between the notches, and the second board edge has a series of notches with nibs formed between the notches, and wherein the heating element winds about the board in a pattern to extend along the surface of the first board side to pass through the first one of said notches to wrap about a nib to extend along the surface of the second side of the board to thence pass through a second notch to pass along the surface of the first side of the board.

17. The toaster/heater assembly of claim 16 further comprising a first electrical terminal and a second electrical terminal, each of which is mounted to the board, and wherein the first end of the first heating element is in electrical connection with the first terminal and extends therefrom to wind through notches and around nibs along the first longitudinal board edge and winds through notches and about nibs along the second longitudinal edge to wrap about the board and thence extend so that the second end of the heating element is in electrical connection with the first terminal, wherein the heating element extends in such pattern to be substantially on the surface of the first side of the board and insubstantially on the surface of the second side of the board, so that almost all of the heat radiated by the heating element radiates outwardly from the surface of the first board side.

18. A toaster/heater assembly for toasting and heating food products, comprising:
(a) a housing;
(b) a frame within the housing;
(c) a toaster/heater unit mounted in association with a frame, the toaster/heater unit comprising a board of insulating material having a bottom and a top, and a first side and a second side, wherein the board has first and second edges, and the first and second board sides each have surfaces, the first board edge has a series of notches with nibs formed between the notches, and the second board edge has a series of notches with nibs formed between the notches;
(d) a heating element mounted in association with the board for radiating heat toward food products placed within the housing; the heating element having first and second ends, wherein the heating element winds about the board in a pattern to extend along the surface of the first board side to pass through the first one of said notches to wrap about a nib to extend along the surface of the second side of the board to thence pass through a second notch to pass along the surface of the first side of the board.

19. The toaster/heater assembly of claim 17 further comprising a first electrical terminal and a second electrical terminal, each of which is mounted to the board, and wherein the first end of the first heating element is in electrical connection with the first terminal and extends therefrom to wind through notches and around nibs along the first longitudinal board edge and winds through notches and about nibs along the second longitudinal edge to wrap about the board and thence extend so that the second end of the heating element is in electrical connection with the first terminal, wherein the heating element extends in such pattern to be substantially on the surface of the first side of the board and insubstantially on the surface of the second side of the board, so that almost all of the heat radiated by the heating element radiates outwardly from the surface of the first board side.

20. A toaster/heater assembly for toasting and heating food products, comprising:
  (a) a housing;
  (b) a frame within the housing;
  (c) a toaster/heater unit mounted in association with the frame, the toaster/heater unit comprising a board of insulating material, the board having first and second longitudinal edges, a bottom and a top, a first side with a substantially flat first surface, and second side with a substantially flat second surface, the board having a plurality of holes extending through the board from the first side to the second side, the holes being aligned generally vertically and located between the longitudinal edges of the board, the plurality of holes comprising an uppermost hole and a bottom hole;
  (d) a heating element having first and second ends, the heating element extending in a pattern to wind from a first point on the first edge thence along the surface of the first board side, thence through a first hole, thence along the surface of the second board side, thence through a second hole above the first hole to the first board side and thence extending along the surface of the first board side to a second point on the first edge which second point is above the first point on the first edge, thence once again to pass along the surface of the first board side to pass through the second hole, thence to pass along the surface of the second board side to pass through a third hole to the first board side, thence along the surface of the first board side to a third point on the first edge which third point is above the second point on the edge, thence again along the surface of the first board side to repeat the aforesaid pattern until the heating element extends to its uppermost point on the first board edge.

21. The toaster assembly of claim 20 wherein the heating element extends from its uppermost point on the first board side to then pass along the surface of the first board side to a first point on the second board edge, thence the element extends along the surface of the first board side to pass through the uppermost hole, thence to extend along the first board side to a second point on the second board edge, and thence to extend along the surface of the first board side through a hole, thence to extend along the surface of the second board side to pass through a hole located beneath the previous hole, thence to extend along the surface of the first board side to a third point on the second edge of the board.

22. The toaster assembly of claim 21 wherein the heating element repeats the aforesaid pattern of extending from the second edge of the board through the plurality of holes until it passes through the bottom hole, and thence extends to a point on the second board edge.

23. The toaster assembly of claim 22 wherein the toaster/heater unit has a first electrical terminal and a second electrical terminal, the first terminal being mounted to the board, and the second terminal being separate from the first terminal and mounted to the board to be laterally spaced from the first terminal.

24. The toaster assembly of claim 23 wherein the first end of the heating element is connected to the first terminal and the second end of the heating element is connected to the second terminal, so that electricity can flow from the first terminal through the heating element to the second terminal so that the heating element emits radiant heat.

25. A toaster/heater assembly for toasting and heating food products, comprising:
  (a) a housing;
  (b) a frame within the housing;
  (c) a toaster/heater ensemble, the ensemble comprising a middle toaster/heater unit comprising a board of insulating material, having a bottom and a top, and a first side and a second side, with a heating element mounted with the board so that the element passes generally equally along the first side of the board and along the second side of the board; the ensemble further comprising a pair of side toaster/heater units, each side unit comprising a board of insulating material having a bottom and a top, and a first side and a second side, and each side unit having a heating element mounted with the board, with almost all of the heating element extending alongside the first board side and little of the heating element extending along the second board side; the two side units being mounted to the sides of the middle unit so that the first side of the first side unit faces a side of the board of the middle unit, and the first side of the second side unit faces the other side of the middle unit.

26. The toaster/heater assembly of claim 25 comprising a plurality of ensembles, the ensembles being arranged relative to the housing and to the frame so that one of the side units of the outermost ensemble has its second side facing the frame and facing the housing, and a second side unit of a second ensemble has its second side facing the frame and facing the housing.

27. A toaster/heater assembly for toasting and heating food products, comprising:
  (a) a housing;
  (b) a frame within the housing;
  (c) a pair of toaster/heater units mounted in association with the frame, the toaster/heater units each comprising a board of insulating material having a bottom and a top, and a first side and a second side, each unit having a heating element mounted in association with the board for radiating heat at least from one of the sides of each of the boards, with a toaster/heater compartment formed therebetween;
  (d) a food support assembly comprising a carriage, the food support assembly being moveably mounted relative to the housing and to the frame, and shaped to hold food within the compartment and move food downwardly into the compartment and upwardly out of the compartment, the carriage comprising a member having a lower substantially flat surface;

(e) an electrical switch mounted in association with the frame, the switch having an activating member moveable to place the switch in an "on" or "off" position, with electrical circuitry to energize the heating element in the "on" position and to de-energize the heating element in the "off" position, the carriage moveable in a vertical direction so that it moves towards the switch activator positioned beneath the carriage so that its substantially flat surface engages the activator to place the switch in the "on" position to cause the heating elements to radiate heat, and the carriage moveable upwardly away from the switch activator to disengage the activator to place the switch in the "off" position to de-energize the heating elements.

28. The toaster/heater assembly of claim 27 wherein the member comprises a plate, the plate having a flange with a lower substantially flat surface for engaging the switch activator.

29. The toaster/heater assembly of claim 27 further comprising an assembly to engage the carriage to hold it against the switch activator to place the switch in the "on" position, and to disengage from the switch activator, comprising a claw member, means for pivotally mounting the claw to the frame; the claw having an initial position and means for biasing the claw to its initial position, the claw having an upper surface that has a curved portion and extends at an angle of about 30° to 60° relative to the horizontal component of the housing, the claw having a talon whose upper surface forms part of the upper surface of the claw, the talon having an underside; the carriage having a projecting member so that when the carriage is moved downwardly, the projecting member engages the upper claw surface to pivot the claw from its initial position so that the projecting member passes beneath the talon underside, to allow the claw to be biased to its initial position with the talon underside overlying the projecting member to hold the carriage in fixed position with the carriage member's substantially flat lower surface engaged with the switch activator to maintain the switch in the "on" position.

30. The assembly of claim 29 wherein the angle of the claw upper surface is about 40° relative to the housing.

31. The assembly of claim 29 wherein the underside of the talon is substantially flat.

* * * * *

UNITED STATES PATENT AND TRADEMARK OFFICE
CERTIFICATE OF CORRECTION

PATENT NO.  : 6,205,910 B1
DATED       : March 27, 2001
INVENTOR(S) : Vaughn

It is certified that error appears in the above-identified patent and that said Letters Patent is hereby corrected as shown below:

<u>Column 22,</u>
Line 18, "relative to the housing." should read -- relative to the horizontal component of the housing. --

Signed and Sealed this

Sixteenth Day of October, 2001

Attest:

NICHOLAS P. GODICI
*Attesting Officer*  *Acting Director of the United States Patent and Trademark Office*